(12) United States Patent  
Cao et al.

(10) Patent No.: US 11,956,090 B2
(45) Date of Patent: Apr. 9, 2024

(54) POE POWER SUPPLY DEVICE, POE POWER SUPPLY SYSTEM, AND INTERFACE PART

(71) Applicant: Huawei Technologies Co., Ltd., Shenzhen (CN)

(72) Inventors: Jincan Cao, Shanghai (CN); Chao Ren, Nanjing (CN); Jian Chen, Shenzhen (CN); Ke Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 17/523,250

(22) Filed: Nov. 10, 2021

(65) Prior Publication Data

US 2022/0150080 A1 May 12, 2022

(30) Foreign Application Priority Data

Nov. 12, 2020 (CN) .......................... 202011263086.9

(51) Int. Cl.
*H04B 10/00* (2013.01)
*G02B 6/42* (2006.01)
*H04L 12/10* (2006.01)

(52) U.S. Cl.
CPC ............ *H04L 12/10* (2013.01); *G02B 6/4274* (2013.01)

(58) Field of Classification Search
CPC .. H04L 12/10; H04L 12/40045; G02B 6/4274
See application file for complete search history.

(56) References Cited

U.S. PATENT DOCUMENTS

| 7,331,819 B2* | 2/2008 | Nelson | G02B 6/4274 439/577 |
| 8,037,324 B2* | 10/2011 | Hussain | G06F 1/266 713/300 |
| 8,043,112 B2* | 10/2011 | Filipon | H01R 13/6658 439/485 |
| 8,358,508 B2* | 1/2013 | Nordin | H04Q 1/035 361/720 |
| 8,358,893 B1* | 1/2013 | Sanderson | G02B 6/4415 385/115 |
| 8,641,429 B2* | 2/2014 | Fish | H01R 13/6658 439/76.1 |
| 9,052,482 B1* | 6/2015 | Siddhaye | H04Q 11/0003 |
| 9,097,090 B2* | 8/2015 | Davey | E21B 47/135 |
| 9,420,715 B2* | 8/2016 | Vasilevsky | H05K 7/1492 |

(Continued)

FOREIGN PATENT DOCUMENTS

| CN | 111129876 A | 5/2020 |
| CN | 111413770 A | 7/2020 |
| WO | 2019173094 A1 | 9/2019 |

*Primary Examiner* — Agustin Bello

(74) *Attorney, Agent, or Firm* — Conley Rose, P.C.

(57) ABSTRACT

A Power over Ethernet (PoE) power supply device, a PoE power supply system, an interface part, and a method for detecting an optical module, and pertaining to the field of communications technologies, where the PoE power supply device includes a photoelectric composite interface part, and wherein the photoelectric composite interface part integrates an optical interface and an electrical interface, and is configured to be coupled to a photoelectric composite module. The photoelectric composite interface part can complete PoE power supply while transmitting a signal.

20 Claims, 6 Drawing Sheets

(56) References Cited

U.S. PATENT DOCUMENTS

| | | | |
|---|---|---|---|
| 9,531,551 B2* | 12/2016 | Balasubramanian | H04L 12/10 |
| 9,800,341 B2* | 10/2017 | Lutgen | H04B 10/272 |
| 10,146,022 B1* | 12/2018 | Beard | G02B 6/4284 |
| 10,541,758 B2* | 1/2020 | Goergen | G02B 6/4293 |
| 10,880,125 B2* | 12/2020 | Mather | H04L 43/10 |
| 11,038,307 B2* | 6/2021 | Sironi | G06F 1/26 |
| 11,095,464 B2* | 8/2021 | Zondag | G02B 6/3817 |
| 11,341,841 B1* | 5/2022 | Pan | H04L 49/351 |
| 11,431,420 B2* | 8/2022 | Goergen | H04L 12/10 |
| 11,438,183 B2* | 9/2022 | Goergen | G06F 1/266 |
| 2007/0010132 A1* | 1/2007 | Nelson | G02B 6/4284 439/577 |
| 2010/0150573 A1* | 6/2010 | Furuyama | G02B 6/4292 385/101 |
| 2010/0302754 A1* | 12/2010 | Nordin | H04Q 1/155 361/810 |
| 2010/0303465 A1* | 12/2010 | Dahlfort | G02B 6/4201 398/115 |
| 2012/0182900 A1* | 7/2012 | Davari | H04L 43/062 370/254 |
| 2012/0301134 A1* | 11/2012 | Davari | H04L 43/0817 398/9 |
| 2013/0046916 A1* | 2/2013 | Dudemaine | H04N 7/22 710/317 |
| 2014/0258742 A1* | 9/2014 | Chien | H04L 12/10 713/300 |
| 2014/0314412 A1* | 10/2014 | Soto | H04B 10/272 398/67 |
| 2015/0026503 A1* | 1/2015 | El-Batal | G06F 3/0625 713/340 |
| 2015/0078740 A1* | 3/2015 | Sipes, Jr. | H04L 12/10 398/16 |
| 2015/0131993 A1* | 5/2015 | Lutgen | G02B 6/00 398/58 |
| 2015/0171577 A1* | 6/2015 | Han | H01R 24/64 439/620.23 |
| 2015/0172221 A1* | 6/2015 | Edwards | H04L 1/002 370/463 |
| 2015/0256748 A1* | 9/2015 | Herzel | G06F 1/30 348/372 |
| 2016/0057518 A1* | 2/2016 | Neudorf | G02B 6/4292 398/45 |
| 2016/0064938 A1* | 3/2016 | Balasubramanian | H04L 12/10 307/11 |
| 2017/0117971 A1* | 4/2017 | Sipes, Jr. | G02B 6/3817 |
| 2017/0354053 A1* | 12/2017 | Irons | H05K 7/1492 |
| 2018/0031775 A1* | 2/2018 | Gurreri | G02B 6/3821 |
| 2018/0210527 A1* | 7/2018 | Panella | H04L 69/32 |
| 2018/0375591 A1* | 12/2018 | Sipes, Jr. | H04L 12/10 |
| 2019/0013696 A1* | 1/2019 | Kanarellis | H02J 7/007 |
| 2019/0069048 A1* | 2/2019 | Panella | H04Q 1/20 |
| 2020/0106627 A1* | 4/2020 | Koper | H04L 12/12 |
| 2020/0153515 A1* | 5/2020 | Goergen | G01J 1/4257 |
| 2020/0235605 A1* | 7/2020 | Kanarellis | H02J 9/061 |
| 2020/0235607 A1* | 7/2020 | Kanarellis | G01R 19/2513 |
| 2021/0075520 A1* | 3/2021 | Soto | H04L 12/2898 |
| 2021/0135890 A1* | 5/2021 | Arduini | H02J 13/00032 |
| 2021/0266188 A1* | 8/2021 | Goergen | G06F 1/26 |
| 2021/0351610 A1* | 11/2021 | Kanarellis | H04L 12/10 |
| 2022/0150080 A1* | 5/2022 | Cao | H04L 12/10 |
| 2022/0295161 A1* | 9/2022 | Crawford | H04L 49/351 |
| 2023/0194812 A1* | 6/2023 | Gao | H01R 13/05 385/88 |
| 2023/0199302 A1* | 6/2023 | Hellman | H04N 23/661 713/300 |
| 2023/0273380 A1* | 8/2023 | Gao | G02B 6/4292 385/88 |

\* cited by examiner

POE POWER SUPPLY DEVICE, POE POWER SUPPLY SYSTEM, AND INTERFACE PART

CROSS-REFERENCE TO RELATED APPLICATION

This disclosure claims priority to Chinese Patent Application No. 202011263086.9 filed on Nov. 12, 2020, which is hereby incorporated by reference in its entirety.

TECHNICAL FIELD

This disclosure relates to the field of communications technologies, and in particular, to a Power over Ethernet (PoE) power supply device, a PoE power supply system, an interface part, and a method for detecting an optical module.

BACKGROUND

PoE is a technology in which a PoE power supply device can supply power to a PoE powered device while transmitting data to the PoE powered device.

For example, the PoE power supply device is a switch, the PoE powered device is an access point (AP) device, and PoE power supply may be implemented between the switch and the AP device through a photoelectric composite cable. At each end of the photoelectric composite cable, there are an optical fiber connector and a power connector that are separated from each other. There are an optical interface and an electrical interface on each of a panel of the switch and a panel of the AP device. An optical module is inserted into each of the optical interface of the switch and the optical interface of the AP device. An optical fiber connector at one end of the photoelectric composite cable is inserted into the optical module of the switch, and the power connector is inserted into the electrical interface of the switch. An optical fiber connector at the other end of the photoelectric composite cable is inserted into the optical module of the AP device, and the power connector is inserted into the electrical interface of the AP device. Therefore, data and electric energy can be simultaneously transmitted between the switch and the AP device through the photoelectric composite cable, to implement PoE power supply.

However, the foregoing solution is not conducive to miniaturization of the PoE power supply device such as the switch.

SUMMARY

Embodiments of this application provide a PoE device, a PoE power supply system, an interface part, and a method for detecting an optical module. The PoE power supply device includes a photoelectric composite interface part. The photoelectric composite interface part integrates an optical interface and an electrical interface, and can be connected to a photoelectric composite module, helping implement miniaturization of the PoE power supply device. Technical solutions for the PoE power supply device, the PoE power supply system, the interface part, and the method for detecting an optical module are described as follows.

According to a first aspect, a PoE power supply device is provided. The PoE power supply device includes a control part, a service processing part, a PoE power supply part, and a photoelectric composite interface part, and there is one or more photoelectric composite interface parts. The control part is separately electrically connected to the service processing part and the PoE power supply part. The photoelectric composite interface part is separately electrically connected to the service processing part and the PoE power supply part. The photoelectric composite interface part integrates an optical interface and an electrical interface, and is configured to be connected to a photoelectric composite module, and the photoelectric composite module integrates an optical component and a PoE power supply component.

A type of the PoE power supply device is not limited in this embodiment of this application. For example, the PoE power supply device may be a switch, a router, or a hub.

The control part is a control center of the PoE power supply device, may include a central processing unit (CPU), a memory, and the like, and is configured to control each part of the PoE power supply device.

The service processing part is a part that implements basic service processing in the PoE power supply device. Based on different types of the PoE power supply device, service processing parts also differ in terms of composition and function. For example, the PoE power supply device is a switch, and the service processing part may be a forwarding chip, which is configured to forward a signal. The service processing part is electrically connected to the photoelectric composite interface part, and can transmit a signal by using the photoelectric composite interface part.

The PoE power supply part is a component that is in the PoE power supply device and that is configured to implement PoE power supply, and may include a micro control unit (MCU) and a power supply chip. Therefore, the PoE power supply part can transmit electric energy introduced through the power interface part to the photoelectric composite interface part, and transmit the electric energy to a PoE powered device by using the photoelectric composite interface part, the photoelectric composite module, and a photoelectric composite cable.

The photoelectric composite interface part integrates the optical interface and the electrical interface, and is configured to be connected to the photoelectric composite module, and therefore can implement PoE power supply while transmitting data. A type of the optical interface integrated into the photoelectric composite interface part is not limited in this embodiment of this application. For example, the optical interface integrated into the photoelectric composite interface part may be any one of a small form-factor pluggable (SFP) optical interface, a gigabit interface converter (GBIC) optical interface, or a 10-gigabit small form-factor pluggable (XFP) optical interface of an optical module.

In addition, the PoE power supply device further includes a power interface part. The power interface part is electrically connected to the control part, the service processing part, and the PoE power supply part, and is configured to be electrically connected to a power supply, and therefore can introduce external electric energy to the control part, the service processing part, and the PoE power supply part. The PoE power supply device may further include an uplink interface, which is configured to be connected to an upstream communications device. The PoE power supply device may further include an optical module power supply part, which is configured to supply power to an inserted optical module.

The photoelectric composite module integrates the optical component and the PoE power supply component. The optical component can implement photoelectric conversion and signal transmission, and the PoE power supply component can transmit electric energy, to implement PoE power supply.

In the solution shown in this embodiment of this application, this embodiment of this application provides the PoE power supply device. The PoE power supply device includes the photoelectric composite interface part, and the photoelectric composite interface part integrates the optical interface and the electrical interface, and is configured to be connected to the photoelectric composite module. The photoelectric composite interface part can complete PoE power supply while transmitting data. In this way, an independent optical interface and an independent electrical interface do not need to be disposed on a panel of the PoE power supply device, but instead, the photoelectric composite interface part that integrates the optical interface and the electrical interface is disposed, thereby facilitating miniaturization of the PoE power supply device, and effectively increasing a quantity of optical modules that can be inserted into the PoE power supply device.

In addition, the photoelectric composite interface part integrates the optical interface and the electrical interface, and can be connected to the photoelectric composite module. Therefore, the photoelectric composite cable on a PoE power supply device side does not need to be split into an independent optical fiber and an independent power cable. Instead, the photoelectric composite cable may be directly connected to the photoelectric composite module by using a photoelectric composite connector, cross cabling is not required for the optical fiber and the power cable, and it is simple to perform plugging and unplugging on site.

In a possible implementation, the photoelectric composite interface part includes an optical cage and a connection socket. There is a cavity inside the optical cage, there is a jack at a first end, the jack communicates with the cavity, and the optical cage is configured to accommodate the photoelectric composite module. The connection socket is located inside the optical cage, and is located at a second end of the optical cage, the connection socket is separately electrically connected to the service processing part and the PoE power supply part, and is configured to be separately connected to a signal connector and a PoE power supply connector on the photoelectric composite module.

The optical cage may also be referred to as a photoelectric composite cage, and may be understood as a structural component of the photoelectric composite interface part, and includes the cavity configured to accommodate the photoelectric composite module. The optical cage may include one cavity, or may include a plurality of separated cavities. When the optical cage includes one cavity, each photoelectric composite interface part includes one optical cage and one connection socket. When the optical cage includes a plurality of separated cavities, there may be one connection socket inside each cavity, and a plurality of photoelectric composite interface parts share one optical cage.

In the solution shown in this embodiment of this application, through setting, the connection socket is separately electrically connected to the service processing part and the PoE power supply part internally, and is separately connected to the signal connector and the PoE power supply connector on the photoelectric composite module externally, so that the photoelectric composite interface part integrates the optical interface and the electrical interface, facilitating miniaturization of the PoE power supply device.

In a possible implementation, the connection socket includes an insulated substrate, a signal terminal, and a PoE power supply terminal, and the signal terminal and the PoE power supply terminal are fastened to the insulated substrate and separated from each other. The signal terminal is electrically connected to the service processing part, and is configured to be connected to the signal connector on the photoelectric composite module. The PoE power supply terminal is electrically connected to the PoE power supply part, and is configured to be connected to the PoE power supply connector on the photoelectric composite module.

The insulated substrate is a structural component of the connection socket, and supports the entire connection socket and separates the signal terminal from the PoE power supply terminal.

The signal terminal is electrically connected to the service processing part internally, and is externally configured to be electrically connected to the signal connector on the photoelectric composite module, so that an electrical signal can be transmitted between the photoelectric composite module and the service processing part. For example, there are a plurality of signal terminals. In addition, the connection socket may further include an optical module power supply terminal, which is configured to supply power to the optical module. Alternatively, it may be understood that some signal terminals may be used as optical module power supply terminals.

The PoE power supply terminal is electrically connected to the PoE power supply part internally, and is externally configured to be connected to the PoE power supply connector on the photoelectric composite module, so that electric energy in the PoE power supply part can be transmitted to the photoelectric composite interface part. For example, there are two PoE power supply terminals: a PoE power supply positive terminal and a PoE power supply negative terminal.

In the solution shown in this embodiment of this application, the signal terminal and the PoE power supply terminal are fastened to the same insulated substrate, so that the connection socket can be connected to both the signal connector and the PoE power supply connector on the photoelectric composite module, facilitating miniaturization of the PoE power supply device.

In a possible implementation, the insulated substrate includes a body part and a protrusion part that are connected to each other, and the protrusion part protrudes from the body part toward the jack of the optical cage. A portion that is of the signal terminal and that is connected to the signal connector is located on the protrusion part. A portion that is of the PoE power supply terminal and that is connected to the PoE power supply connector is located on the body part.

In the solution shown in this embodiment of this application, through setting, the portion that is of the signal terminal and that is connected to the signal connector is located on the protrusion part, and the portion that is of the PoE power supply terminal and that is connected to the PoE power supply connector is located on the body part, so that the PoE power supply terminal retracts relative to the signal terminal, and existence of the PoE power supply terminal does not affect insertion of a common optical module.

In addition, this design also increases a distance between the PoE power supply terminal and the signal terminal, and reduces a possibility that a signal transmitted by the signal terminal is radiated to the PoE power supply terminal.

In a possible implementation, the signal terminal includes a signal terminal internal connection part, a signal terminal transmission part, and a signal terminal external connection part that are sequentially connected. The signal terminal internal connection part is located on a bottom side of the insulated substrate, and is configured to be electrically connected to the service processing part. The signal terminal transmission part is located inside the insulated substrate. There is an insertion slot on a side that is of the insulated substrate and that faces the jack, and the signal terminal external connection part is located inside the insertion slot, and is configured to be connected to the signal connector on the photoelectric composite module.

In a possible implementation, the PoE power supply terminal includes a power supply terminal internal connection part, a power supply terminal transmission part, and a power supply terminal external connection part that are sequentially connected. The power supply terminal internal connection part is located on the bottom side of the insulated substrate, and is configured to be electrically connected to the PoE power supply part. The power supply terminal transmission part is located inside the insulated substrate. The power supply terminal external connection part is located on the side that is of the insulated substrate and that faces the jack, and is configured to be connected to the PoE power supply connector on the photoelectric composite module.

In a possible implementation, the power supply terminal external connection part is strip-shaped, and is perpendicular to an insertion direction of the photoelectric composite module.

In the solution shown in this embodiment of this application, compared with a technical solution in which the power supply terminal external connection part is parallel to the insertion direction of the photoelectric composite module, the power supply terminal external connection part is disposed perpendicular to the insertion direction of the photoelectric composite module, so that the power supply terminal external connection part is relatively far away from the signal terminal external connection part (the signal terminal external connection part is parallel to the insertion direction of the photoelectric composite module), thereby effectively reducing radiation of a high-speed signal, and reducing a possibility that a signal transmitted by the signal terminal is leaked to the PoE power supply terminal and is then conducted out through a power cable.

In a possible implementation, there is an insertion hole on the side that is of the insulated substrate and that faces the jack. The power supply terminal external connection part is located inside the insertion hole.

In a possible implementation, the signal terminal includes a first signal terminal and a second signal terminal, and the PoE power supply terminal includes a first PoE power supply terminal and a second PoE power supply terminal. The first signal terminal and the first PoE power supply terminal are configured to be respectively connected to a signal connector and a PoE power supply connector on one photoelectric composite module, and the second signal terminal and the second PoE power supply terminal are configured to be respectively connected to a signal connector and a PoE power supply connector on another photoelectric composite module. A signal terminal external connection part of the first signal terminal and a signal terminal external connection part of the second signal terminal are located between a power supply terminal external connection part of the first PoE power supply terminal and a power supply terminal external connection part of the second PoE power supply terminal.

In the solution shown in this embodiment of this application, in the foregoing design, the connection socket can be connected to two photoelectric composite modules.

In a possible implementation, there are a plurality of photoelectric composite interface parts, and the plurality of photoelectric composite interface parts are arranged in an array on a panel of the PoE power supply device. Structures of any two photoelectric composite interface parts at opposite positions in two adjacent rows are symmetrical to each other.

In a possible implementation, the PoE power supply device further includes an indicator, there is one or more indicators in a one-to-one correspondence with the photoelectric composite interface part, and the indicator is electrically connected to the control part. The control part is configured to control, based on a detected PoE power supply status of each photoelectric composite interface part, a PoE power supply status that is of a corresponding photoelectric composite interface part and that is indicated by each indicator.

The indicator may be a newly added indicator to indicate the PoE power supply status, or may reuse or use an existing indicator used to indicate a data connection or data traffic.

The PoE power supply status includes whether there is PoE power supply.

In the solution shown in this embodiment of this application, the indicator used to indicate the PoE power supply status of the photoelectric composite interface part is disposed on the PoE power supply device, so that it is convenient for a staff member to check the PoE power supply status of the corresponding photoelectric composite interface part by using the indicator, facilitating routine maintenance of the PoE power supply device.

In a possible implementation, the indicator is a multi-function indicator. The control part is further configured to control, based on a detected data transmission status of each photoelectric composite interface part, a data transmission status that is of a corresponding photoelectric composite interface part and that is indicated by each indicator.

The data transmission status includes whether there is a connection and whether there is data traffic.

In the solution shown in this embodiment of this application, the indicator is set to a multi-function indicator, so that the data transmission status and the PoE power supply status of the photoelectric composite interface part can be indicated, a quantity of indicators can be reduced, panel size occupation of the indicator can be reduced, and costs of the PoE power supply device can be reduced.

In a possible implementation, the PoE power supply device further includes a key part, and the key part is electrically connected to the control part. The control part is configured to, when a switch instruction sent by the key part is received, control the indicator to switch between indicating the PoE power supply status and indicating the data transmission status.

In the solution shown in this embodiment of this application, the key part is disposed, so that it is convenient for the staff member to switch content indicated by the indicator.

In a possible implementation, the PoE power supply device further includes a mode indicator, and the mode indicator is electrically connected to the control part. The control part is further configured to, when the switch instruction sent by the key part is received, control the mode indicator to switch between a first display state and a second display state.

The first display state indicates that the indicator indicates the PoE power supply status, and the second display state indicates that the indicator indicates the data transmission status.

In the solution shown in this embodiment of this application, the mode indicator is disposed, so that it can be convenient to determine, by using the mode indicator, whether the indicator indicates the PoE power supply status or the data transmission status.

In a possible implementation, the PoE power supply device is a PoE switch, and the indicator is a LINK indicator or an ACT indicator.

The ACT indicator is an indicator that is on the switch and that is originally used to indicate whether there is data traffic on an optical interface. For example, when the ACT indicator is steady on, it indicates that there is data traffic, and when the ACT indicator is steady off, it indicates that there is no data traffic.

In some switches, there are both the ACT indicator and the LINK indicator, and in some switches, there is only the LINK indicator. When there are both the ACT indicator and the LINK indicator, the LINK indicator is an indicator that is on the switch and that is originally used to indicate whether there is a connection on the optical interface. For example, when the LINK indicator is steady on, it indicates that there is a connection, and when the LINK indicator is steady off, it indicates that there is no connection. When there is only the LINK indicator, the LINK indicator is an indicator that is on the switch and that is originally used to indicate whether there is a connection and whether there is data traffic on the optical interface. For example, when the LINK indicator is steady on, it indicates that there is a connection, when the LINK indicator is blinking, it indicates that there is data traffic, and when the LINK indicator is steady off, it indicates that there is no connection.

In the solution shown in this embodiment of this application, an existing ACT indicator or an existing LINK indicator is configured to indicate the PoE power supply status, so that a new indicator does not need to be added to the PoE power supply device. Therefore, a panel size and costs of the PoE power supply device are reduced.

In a possible implementation, the control part is configured to, when an optical module is inserted into the photoelectric composite interface part, if a type flag bit of the optical module indicates that the optical module is a photoelectric composite module and a PoE powered device connected to the optical module is in position, control the PoE power supply part to supply power to the PoE powered device.

The type flag bit is stored in a register of the optical module, and may be a reserved bit of the optical module.

In the solution shown in this embodiment of this application, the photoelectric composite interface part may be connected to both the photoelectric composite module and a common optical module (a non-photoelectric composite module, that is, an optical module with no PoE power supply function).

In this case, after an optical module is inserted into the photoelectric composite interface part, the control part may detect a type of the optical module, and perform a corresponding operation based on a type detection result.

In the foregoing design, the PoE power supply device can perform a corresponding operation in a timely manner based on the type of the inserted optical module, so that when the photoelectric composite module is inserted, the PoE power supply device can supply power to the PoE powered device in a timely manner by using the photoelectric composite module, and when the common optical module is inserted, the PoE power supply device does not output electric energy by using the PoE power supply part. This saves resources.

In a possible implementation, after the controlling the PoE power supply part to supply power to the PoE powered device, the control part is further configured to control the PoE power supply device to supply power to the optical module.

In a possible implementation, when the optical module is inserted into the photoelectric composite interface part, the control part is further configured to, if the type flag bit of the optical module indicates that the optical module is a non-photoelectric composite module, control the PoE power supply device to supply power to the optical module.

According to a second aspect, a PoE power supply system is provided. The PoE power supply system includes a PoE power supply device, a first photoelectric composite module, a first photoelectric composite connector, a photoelectric composite cable, a second photoelectric composite connector, a second photoelectric composite module, and a PoE powered device that are sequentially connected, and the PoE power supply device is the PoE power supply device described in any implementation of the first aspect.

In a possible implementation, there are a plurality of photoelectric composite interface parts on the PoE power supply device, and the plurality of photoelectric composite interface parts are arranged in an array on a panel of the PoE power supply device. The photoelectric composite cable includes an optical fiber and a power cable, and a position of the power cable corresponds to space between two adjacent rows of photoelectric composite interface parts.

In the solution shown in this embodiment of this application, the power cable is routed in the space between two adjacent rows of photoelectric composite interface parts, so that space of the PoE power supply device is fully used.

According to a third aspect, an interface part is provided. The interface part integrates an optical interface and an electrical interface, and is applied to a PoE power supply device, and the interface part includes an optical cage and a connection socket.

The optical cage is configured to accommodate a photoelectric composite module, and the photoelectric composite module is an optical module that integrates an optical component and a PoE power supply component.

The connection socket is located inside the optical cage, and is configured to be separately connected to a signal connector and a PoE power supply connector on the photoelectric composite module.

In a possible implementation, there is a cavity inside the optical cage, there is a jack at a first end, and the jack communicates with the cavity.

The connection socket is located inside the optical cage, and is located at a second end of the optical cage.

In a possible implementation, the connection socket includes an insulated substrate, a signal terminal, and a PoE power supply terminal, and the signal terminal and the PoE power supply terminal are fastened to the insulated substrate and separated from each other.

The signal terminal is configured to be connected to the signal connector on the photoelectric composite module.

The PoE power supply terminal is configured to be connected to the PoE power supply connector on the photoelectric composite module.

In a possible implementation, the insulated substrate includes a body part and a protrusion part that are connected to each other, and the protrusion part protrudes from the body part toward the jack of the optical cage.

A portion that is of the signal terminal and that is connected to the signal connector is located on the protrusion part.

A portion that is of the PoE power supply terminal and that is connected to the PoE power supply connector is located on the body part.

In a possible implementation, the signal terminal includes a signal terminal internal connection part, a signal terminal transmission part, and a signal terminal external connection part that are sequentially connected.

The signal terminal internal connection part is located on a bottom side of the insulated substrate.

The signal terminal transmission part is located inside the insulated substrate.

There is an insertion slot on a side that is of the insulated substrate and that faces the jack, and the signal terminal external connection part is located inside the insertion slot, and is configured to be connected to the signal connector on the photoelectric composite module.

In a possible implementation, the PoE power supply terminal includes a power supply terminal internal connection part, a power supply terminal transmission part, and a power supply terminal external connection part that are sequentially connected.

The power supply terminal internal connection part is located on the bottom side of the insulated substrate.

The power supply terminal transmission part is located inside the insulated substrate.

The power supply terminal external connection part is located on the side that is of the insulated substrate and that faces the jack, and is configured to be connected to the PoE power supply connector on the photoelectric composite module.

In a possible implementation, the power supply terminal external connection part is strip-shaped, and is perpendicular to an insertion direction of the photoelectric composite module.

According to a fourth aspect, a method for detecting an optical module is provided. The method is applied to a PoE power supply device, the PoE power supply device includes a photoelectric composite interface part, the photoelectric composite interface part integrates an optical interface and an electrical interface, and the method includes, when the optical module is inserted into the photoelectric composite interface part, if a type flag bit of the optical module indicates that the optical module is a photoelectric composite module and a PoE powered device connected to the optical module is in position, controlling the PoE power supply part to supply power to the PoE powered device.

In a possible implementation, after the controlling the PoE power supply part to supply power to the PoE powered device, the method further includes controlling the PoE power supply device to supply power to the optical module.

In a possible implementation, when the optical module is inserted into the photoelectric composite interface part, the method further includes, if the type flag bit of the optical module indicates that the optical module is a non-photoelectric composite module, controlling the PoE power supply device to supply power to the optical module.

Beneficial effects of the technical solutions provided in the embodiments of this application are as follows.

The embodiments of this application provide the PoE power supply device. The PoE power supply device includes the photoelectric composite interface part, and the photoelectric composite interface part integrates the optical interface and the electrical interface, and is configured to be connected to the photoelectric composite module. The photoelectric composite interface part can complete PoE power supply while transmitting data. In this way, an independent optical interface and an independent electrical interface do not need to be disposed on the panel of the PoE power supply device, but instead, the photoelectric composite interface part that integrates the optical interface and the electrical interface may be disposed, thereby facilitating miniaturization of the PoE power supply device, and effectively increasing a quantity of optical modules that can be connected to the PoE power supply device.

LEGEND DESCRIPTION

Figure 1:
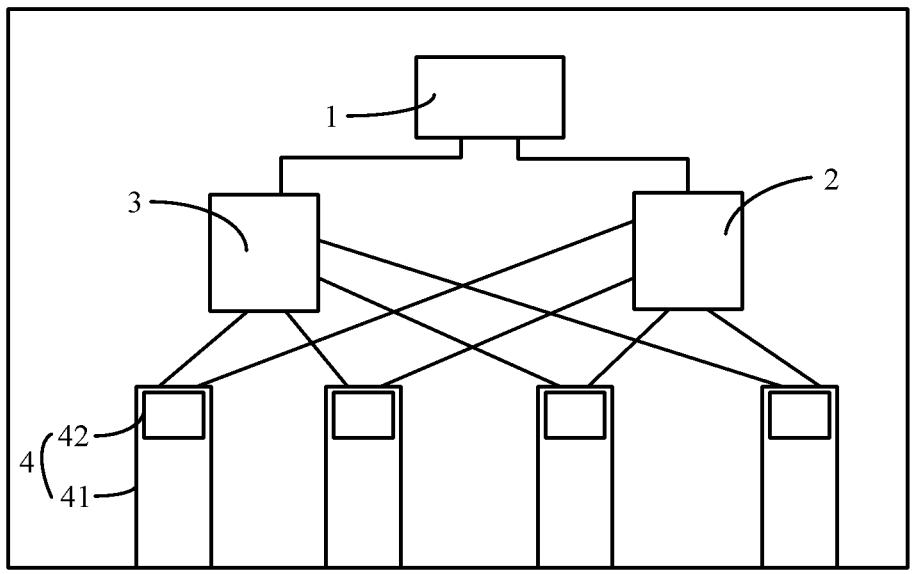
FIG. 1 is a schematic diagram of a PoE power supply device according to an embodiment of this application.

1. Control part; 2. Service processing part; 3. PoE power supply part; 4. Photoelectric composite interface part; 5. Indicator; 6. Key part; 7. Mode indicator; 41. Optical cage; 411. Jack; 42. Connection socket; 421. Insulated substrate; 421a. Insertion slot; 421b. Insertion hole; 4211. Body part; 4212. Protrusion part; 422. Signal terminal; 422a. First signal terminal; 422b. Second signal terminal; 4221. Signal terminal internal connection part; 4222. Signal terminal transmission part; 4223. Signal terminal external connection part; 423. PoE power supply terminal; 423a. First PoE power supply terminal; 423b. Second PoE power supply terminal; 4231. Power supply terminal internal connection part; 4232. Power supply terminal transmission part; 4233. Power supply terminal external connection part; 8. Photoelectric composite module; 81. Signal connector; 82. Power supply connector; 9. Photoelectric composite cable; 91. Optical fiber; and 92. Power cable.

DESCRIPTION OF EMBODIMENTS

PoE is a technology in which a PoE power supply device can supply power to a PoE powered device while transmitting data to the PoE powered device. Common PoE power supply devices include a switch, a router, a hub, and the like. Common PoE powered devices include an Internet Protocol (IP) telephone set, an AP device, a network camera, and the like. The PoE power supply device may also be referred to as power sourcing equipment (PSE), and the PoE powered device may also be referred to as a powered device (PD).

To implement PoE power supply, an independent optical interface and an independent electrical interface need to be disposed on a panel of a PoE power supply device (such as a switch) in a related technology. The optical interface is configured to be connected to an optical module to implement a data transmission function, and the electrical interface is configured to be connected to a power connector to implement a power supply function. For example, an independent SFP optical interface and an RJ45 electrical interface are disposed on a panel of an existing switch. The SFP optical interface implements the data transmission function, and the RJ45 electrical interface implements the power supply function.

However, the optical interface and the electrical interface in the related technology occupy an excessively large panel size. This is not conducive to miniaturization of the PoE power supply device.

In addition, the optical interface and the electrical interface are independent of each other, and therefore a photoelectric composite cable needs to be split into an optical fiber and a power cable on the PoE power supply device. The optical fiber and the power cable are routed in a cross cabling manner, and are then separately connected to the electrical interface and the optical module on the optical interface. Consequently, interference between the optical fiber and the power cable is caused during plugging and unplugging of the photoelectric composite cable on site, and it is difficult to perform plugging and unplugging.

In view of this, an embodiment of this application provides a PoE power supply device. The PoE power supply device includes a photoelectric composite interface part. The photoelectric composite interface part integrates an optical interface and an electrical interface, and is configured to be connected to a photoelectric composite module, thereby effectively resolving a problem of miniaturization of the PoE power supply device and a problem of cross cabling for an optical fiber and a power cable.

The photoelectric composite module is an optical module that can complete PoE power supply while completing conversion between an optical signal and an electrical signal. In addition to an optical component, the photoelectric composite module includes a PoE power supply component. A type of the PoE power supply device is not specifically limited in this embodiment of this application. For example, the PoE power supply device may be a switch, a router, or a hub.

The following describes in more detail a structure of the PoE power supply device.

An embodiment of this application provides a PoE power supply device. As shown in FIG. 1, the PoE power supply device includes a control part 1, a service processing part 2, a PoE power supply part 3, and a photoelectric composite interface part 4, and there is one or more photoelectric composite interface parts 4. The control part 1 is separately electrically connected to the service processing part 2 and the PoE power supply part 3. The photoelectric composite interface part 4 is separately electrically connected to the service processing part 2 and the PoE power supply part 3. The photoelectric composite interface part 4 integrates an optical interface and an electrical interface, and is configured to be connected to a photoelectric composite module.

The control part 1 is a control center of the PoE power supply device, may include a CPU, a memory, and the like, and is configured to control each part of the PoE power supply device.

The service processing part 2 is a part that implements basic service processing in the PoE power supply device. Based on different types of the PoE power supply device, service processing parts 2 also differ in terms of composition and function. For example, the PoE power supply device is a switch, and the service processing part 2 may be a forwarding chip, which is configured to forward a signal. The service processing part 2 is electrically connected to the photoelectric composite interface part 4, and can transmit data by using the photoelectric composite interface part 4.

The PoE power supply part 3 is a component that is in the PoE power supply device and that is configured to implement PoE power supply, and may include an MCU and a power supply chip. Therefore, the PoE power supply part 3 can transmit electric energy introduced through the power interface part to the photoelectric composite interface part 4, and transmit the electric energy to a PoE powered device by using the photoelectric composite interface part 4, the photoelectric composite module, and a photoelectric composite cable.

The photoelectric composite interface part 4 integrates the optical interface and the electrical interface, and is configured to be connected to the photoelectric composite module, and therefore can implement PoE power supply while transmitting data. A type of the optical interface integrated into the photoelectric composite interface part 4 is not limited in this embodiment of this application. For example, the optical interface integrated into the photoelectric composite interface part 4 may be any one of an SFP optical interface, a GBIC optical interface, or a XFP optical interface of an optical module.

In addition, the PoE power supply device further includes a power interface part. The power interface part is electrically connected to the control part 1, the service processing part 2, and the PoE power supply part 3, and is configured to be electrically connected to a power supply, and therefore can introduce external electric energy to the control part 1, the service processing part 2, and the PoE power supply part 3. The PoE power supply device may further include an uplink interface, which is configured to be connected to an upstream communications device. The PoE power supply device may further include a dedicated optical module power supply part. The optical module power supply part is electrically connected to the power interface part and the control part 1, and is configured to supply power to an optical component on the photoelectric composite module.

This embodiment of this application provides the PoE power supply device. The PoE power supply device includes the photoelectric composite interface part 4, and the photoelectric composite interface part 4 integrates the optical interface and the electrical interface, and is configured to be connected to the photoelectric composite module. The photoelectric composite interface part 4 can complete PoE power supply while transmitting data. In this way, an independent optical interface and an independent electrical interface do not need to be disposed on a panel of the PoE power supply device, but instead, the photoelectric composite interface part 4 that integrates the optical interface and the electrical interface is disposed, thereby facilitating miniaturization of the PoE power supply device, and effectively increasing a quantity of optical modules that can be connected to the PoE power supply device. For example, for a switch using the photoelectric composite interface part 4, there can be 48 photoelectric composite interface parts on a 1U switch, in other words, the switch can be connected to 48 photoelectric composite modules.

In addition, the photoelectric composite interface part 4 integrates the optical interface and the electrical interface, and can be connected to the photoelectric composite module. Therefore, the photoelectric composite cable on a PoE power supply device side does not need to be split into an independent optical fiber and an independent power cable. Instead, the photoelectric composite cable may be directly connected to the photoelectric composite module by using a photoelectric composite connector, cross cabling is not required for the optical fiber and the power cable, and it is simple to perform plugging and unplugging on site.

The following describes a structure of the photoelectric composite interface part 4.

Figure 2:
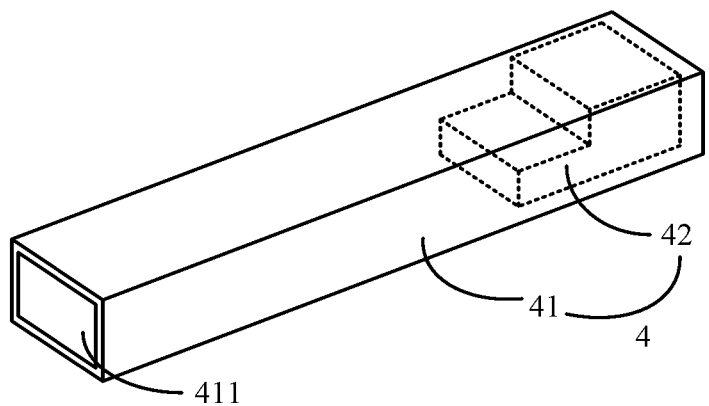
FIG. 2 is a schematic diagram of a photoelectric composite interface part according to an embodiment of this application.

As shown in FIG. 2, the photoelectric composite interface part 4 includes an optical cage 41 and a connection socket 42. There is a cavity inside the optical cage 41, there is a jack 411 at a first end, the jack 411 communicates with the cavity 410, and the optical cage 41 is configured to accommodate the photoelectric composite module. The connection socket 42 is located inside the optical cage 41, and is located at a second end of the optical cage 41, the connection socket 42 is separately electrically connected to the service processing part 2 and the PoE power supply part 3, and is configured to be separately connected to a signal connector and a PoE power supply connector on the photoelectric composite module.

The optical cage 41 is a structural component of the photoelectric composite interface part 4, may also be referred to as a photoelectric composite cage, and includes the cavity configured to accommodate the photoelectric composite module. The optical cage 41 may include one cavity, and is referred to as a single-port optical cage. The optical cage 41 may alternatively include a plurality of separated cavities, and is referred to as a multi-port optical cage. When the optical cage 41 includes one cavity, each photoelectric composite interface part 4 includes one optical cage 41 and one connection socket 42. When the optical cage 41 includes a plurality of separated cavities, there may be one connection socket 42 in each cavity, and a plurality of photoelectric composite interface parts 4 share one optical cage 41.

It should be noted that, one optical cage 41 and all connection sockets 42 in the optical cage 41 may be considered as one communications interface part, or each cavity of the optical cage 41 and a connection socket 42 in the cavity may be considered as one communications interface part. For example, for a 12-port optical cage 41, it may be considered that the optical cage 41 and connection sockets 42 in the optical cage 41 form one photoelectric composite interface part 4, or it may be considered that 12 photoelectric composite interface parts 4 are formed. In this embodiment of this application, a case in which 12 photoelectric composite interface parts 4 are formed is used as an example for description, in other words, each jack 411 corresponds to one photoelectric composite interface part 4.

Figure 3:
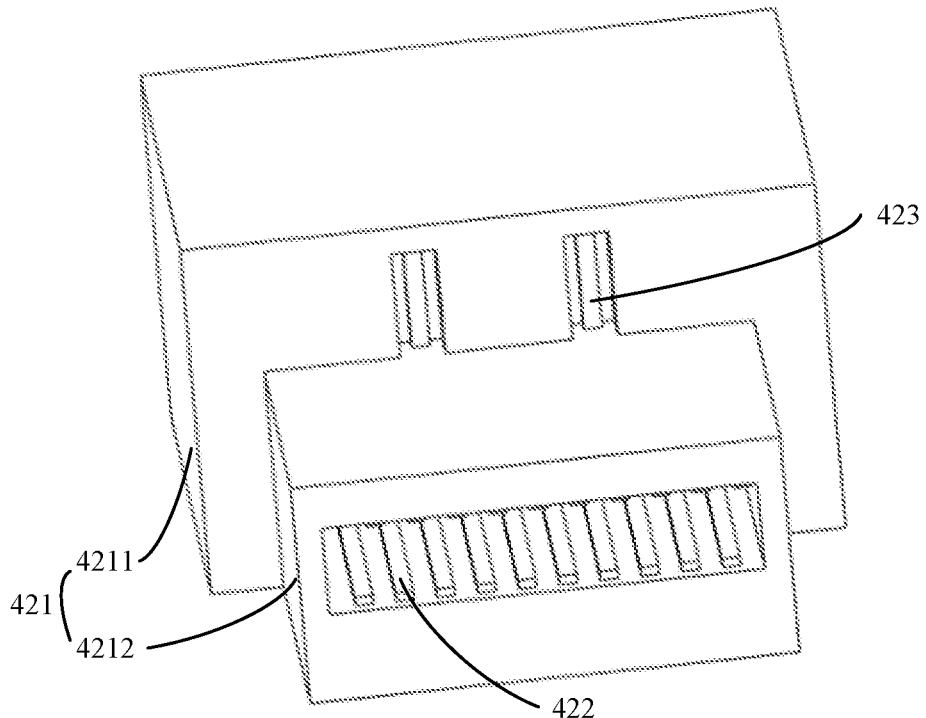
FIG. 3 is a schematic diagram of a connection socket according to an embodiment of this application.

The connection socket 42 is an electrical component on the photoelectric composite interface part 4. As shown in FIG. 3, the connection socket 42 includes an insulated substrate 421, a signal terminal 422, and a PoE power supply terminal 423. The signal terminal 422 and the PoE power supply terminal 423 are fastened to the insulated substrate 421 and separated from each other. The signal terminal 422 is electrically connected to the service processing part 2, and is configured to be connected to the signal connector on the photoelectric composite module. The PoE power supply terminal 423 is electrically connected to the PoE power supply part 3, and is configured to be connected to the PoE power supply connector on the photoelectric composite module.

The insulated substrate 421 is a structural component of the connection socket 42, and supports the entire connection socket 42 and separates the signal terminal 422 from the PoE power supply terminal 423.

The signal terminal 422 is electrically connected to the service processing part 2 internally, and is externally configured to be electrically connected to the signal connector on the photoelectric composite module, so that an electrical signal can be transmitted between the photoelectric composite module and the service processing part 2. For example, there are a plurality of signal terminals. In addition, the connection socket 42 may further include an optical module power supply terminal, which is configured to supply power to the optical module. Alternatively, it may be understood that some signal terminals may be used as optical module power supply terminals.

The PoE power supply terminal 423 is electrically connected to the PoE power supply part 3 internally, and is externally configured to be connected to the PoE power supply connector on the photoelectric composite module, so that electric energy in the PoE power supply part 3 can be transmitted to the photoelectric composite interface part 4. For example, there are two PoE power supply terminals 423: a PoE power supply positive terminal and a PoE power supply negative terminal.

The signal terminal 422 and the PoE power supply terminal 423 are fastened to the same insulated substrate 421, so that the connection socket 42 can be connected to both the signal connector and the PoE power supply connector on the photoelectric composite module, facilitating miniaturization of the PoE power supply device.

The following separately describes the insulated substrate 421, the signal terminal 422, and the PoE power supply terminal 423.

As shown in FIG. 3, the insulated substrate 421 includes a body part 4211 and a protrusion part 4212 that are connected to each other, and the protrusion part 4212 protrudes from the body part 4211 toward the jack 411 of the optical cage 41. A portion that is of the signal terminal 422 and that is connected to the signal connector is located on the protrusion part 4212. A portion that is of the PoE power supply terminal 423 and that is connected to the PoE power supply connector is located on the body part 4211.

Through setting, the portion that is of the signal terminal 422 and that is connected to the signal connector is located on the protrusion part 4212, and the portion that is of the PoE power supply terminal 423 and that is connected to the PoE power supply connector is located on the body part 4211, so that the PoE power supply terminal 423 retracts relative to the signal terminal 422. In this way, existence of the PoE power supply terminal 423 does not affect insertion of a common optical module.

In addition, this design also increases a distance between the PoE power supply terminal 423 and the signal terminal 422, and reduces a possibility that a signal transmitted by the signal terminal 422 is radiated to the PoE power supply terminal 423.

Figure 4:
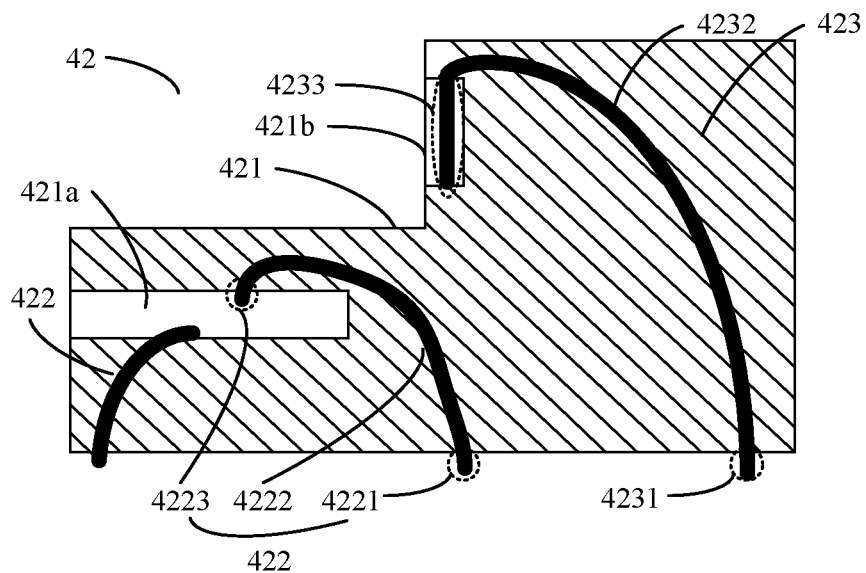
FIG. 4 is a schematic cross-sectional diagram of a connection socket according to an embodiment of this application.

As shown in FIG. 4, the signal terminal 422 includes a signal terminal internal connection part 4221, a signal terminal transmission part 4222, and a signal terminal external connection part 4223 that are sequentially connected. The signal terminal internal connection part 4221 is located on a bottom side of the insulated substrate 421, and is configured to be electrically connected to the service processing part 2. The signal terminal transmission part 4222 is located inside the insulated substrate 421. There is an insertion slot 421a on a side that is of the insulated substrate 421 and that faces the jack 411, and the signal terminal external connection part 4223 is located inside the insertion slot 421a, and is configured to be connected to the signal connector on the photoelectric composite module.

Figure 9:
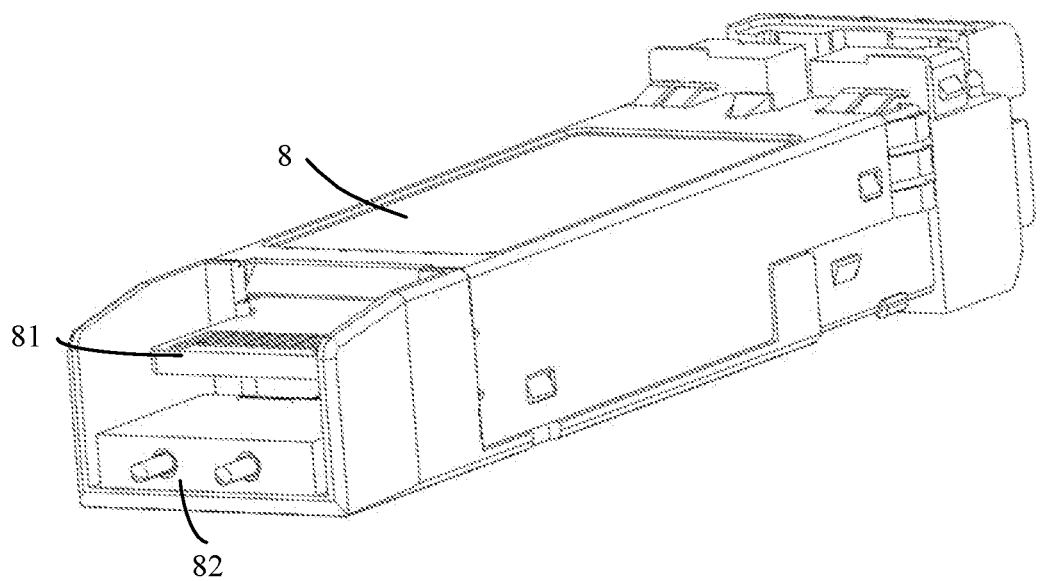
FIG. 9 is a schematic diagram of a photoelectric composite module according to an embodiment of this application.

The signal terminal external connection part 4223 may be located on a slot wall of the insertion slot 421a. As shown in FIG. 9, a signal connector 81 on the photoelectric composite module may be in a form of a printed circuit board (PCB), and there is an edge connector used to transmit a signal on the PCB. When the photoelectric composite module is inserted into the photoelectric composite interface part 4, the PCB is inserted into the insertion slot 421*a*, and the edge connector located on the PCB is in contact with the signal terminal external connection part 4223 located inside the insertion slot 421*a*, so that the signal terminal 422 is connected to the signal connector 81 on the photoelectric composite module.

As shown in FIG. 4, the PoE power supply terminal 423 includes a power supply terminal internal connection part 4231, a power supply terminal transmission part 4232, and a power supply terminal external connection part 4233 that are sequentially connected. The power supply terminal internal connection part 4231 is located on the bottom side of the insulated substrate 421, and is configured to be electrically connected to the PoE power supply part 3. The power supply terminal transmission part 4232 is located inside the insulated substrate 421. The power supply terminal external connection part 4233 is located on the side that is of the insulated substrate 421 and that faces the jack 411, and is configured to be connected to the PoE power supply connector on the photoelectric composite module.

The power supply terminal external connection part 4233 may be strip-shaped, and is perpendicular to an insertion direction of the photoelectric composite module. There is an insertion hole 421*b* on the side that is of the insulated substrate 421 and that faces the jack 411, and the power supply terminal external connection part 4233 may be located inside the insertion hole 421*b*.

As shown in FIG. 9, the signal connector on the photoelectric composite module may be in a form of a pin, and the pin is made of a metal material, and can transmit electric energy. When the photoelectric composite module is inserted into the photoelectric composite interface part 4, the pin is inserted into the insertion hole 421*b* and is in contact with the power supply terminal external connection part 4233, so that the PoE power supply terminal 423 is connected to the PoE power supply connector 82 on the photoelectric composite module.

In addition, the power supply terminal external connection part 4233 is disposed perpendicular to the insertion direction of the photoelectric composite module, so that the power supply terminal external connection part 4233 is relatively far away from the signal terminal external connection part 4223 (the signal terminal external connection part 4223 is parallel to the insertion direction of the photoelectric composite module), thereby effectively reducing radiation of a high-speed signal, and reducing a possibility that a signal transmitted by the signal terminal 422 is leaked to the PoE power supply terminal 423 and is then conducted out through a power cable.

In a specific implementation, the connection socket 42 may be designed as being capable of being connected to two photoelectric composite modules. In this case, two optical cages 41 may share one connection socket 42, or one connection socket 42 extends into two cavities of one optical cage 41. In this case, one connection socket 42 can form two photoelectric composite interface parts 4.

Figure 5:
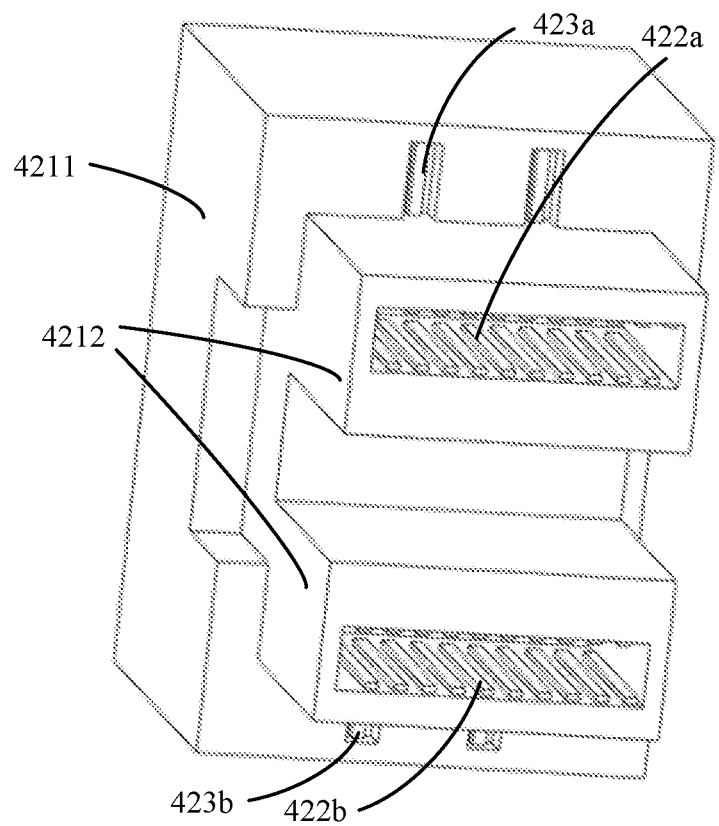
FIG. 5 is a schematic diagram of a connection socket according to an embodiment of this application.

As shown in FIG. 5, the signal terminal 422 includes a first signal terminal 422*a* and a second signal terminal 422*b*, and the PoE power supply terminal 423 includes a first PoE power supply terminal 423*a* and a second PoE power supply terminal 423*b*. The first signal terminal 422*a* and the first PoE power supply terminal 423*a* are configured to be respectively connected to a signal connector and a PoE power supply connector on one photoelectric composite module, and the second signal terminal 422*b* and the second PoE power supply terminal 423*b* are configured to be respectively connected to a signal connector and a PoE power supply connector on another photoelectric composite module. A signal terminal external connection part 4223 of the first signal terminal 422*a* and a signal terminal external connection part 4223 of the second signal terminal 422*b* are located between a power supply terminal external connection part 4233 of the first PoE power supply terminal 423*a* and a power supply terminal external connection part 4233 of the second PoE power supply terminal 423*b*.

The connection socket 42 shown in FIG. 5 is used as an example. A signal terminal 422 located on an upper part is referred to as the first signal terminal 422*a*, and a signal terminal 422 located on a lower part is referred to as the second signal terminal 422*b*. Similarly, a PoE power supply terminal 423 located on an upper part is referred to as the first PoE power supply terminal 423*a*, and a PoE power supply terminal 423 located on a lower part is referred to as the second PoE power supply terminal 423*b*. It can be seen from FIG. 5 that a plurality of first signal terminals 422*a* and a plurality of second signal terminals 422*b* are respectively located in an upper insertion slot and a lower insertion slot, and there are two first PoE power supply terminals 423*a* and two second PoE power supply terminals 423*b*, and the two first PoE power supply terminals 423*a* and the two second PoE power supply terminals 423*b* are respectively located in an upper insertion hole and a lower insertion hole.

Figure 6:
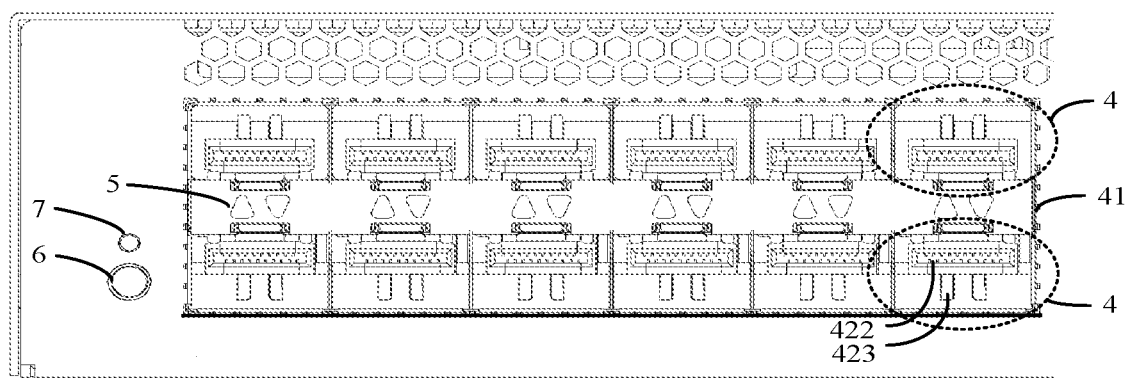
FIG. 6 is a schematic diagram of a panel of a PoE power supply device according to an embodiment of this application.

In a specific implementation, as shown in FIG. 6, there are a plurality of photoelectric composite interface parts 4, and the plurality of photoelectric composite interface parts 4 are arranged in an array on a panel of the PoE power supply device. Structures of any two photoelectric composite interface parts 4 at opposite positions in two adjacent rows are symmetrical to each other.

To help a staff member conveniently observe a PoE power supply status of each photoelectric composite interface part 4, as shown in FIG. 6, the PoE power supply device further includes an indicator 5. There are one or more indicators 5 in a one-to-one correspondence with the photoelectric composite interface part 4, and the indicator 5 is electrically connected to the control part 1. The control part 1 is configured to control, based on a detected PoE power supply status of each photoelectric composite interface part 4, a PoE power supply status that is of a corresponding photoelectric composite interface part 4 and that is indicated by each indicator 5.

The indicator 5 may be a newly added indicator to indicate the PoE power supply status, or may reuse or use an existing indicator used to indicate data transmission.

The indicator 5 used to indicate the PoE power supply status of the photoelectric composite interface part 4 is configured on the PoE power supply device, so that it is convenient for the staff member to check the PoE power supply status of the photoelectric composite interface part 4 by using the indicator 5, and it is convenient for the staff member to perform routine maintenance of the PoE power supply device.

To reduce a panel size of the PoE power supply device and reduce a quantity of indicators disposed on the panel, the indicator 5 may be set to a multi-function indicator. The control part 1 is further configured to control, based on a detected data transmission status of each photoelectric composite interface part 4, a data transmission status that is of a corresponding photoelectric composite interface part 4 and that is indicated by each indicator 5. In other words, the indicator 5 can indicate both the PoE power supply status and the data transmission status.

To help control the indicator 5 to switch between indicating the PoE power supply status and indicating the data transmission status, in a specific implementation, as shown in FIG. 6, the PoE power supply device further includes a key part 6, and the key part 6 is electrically connected to the control part 1. The control part 1 is configured to, when a switch instruction sent by the key part 6 is received, control the indicator 5 to switch between indicating the PoE power supply status and indicating the data transmission status.

To clearly know whether the indicator 5 indicates the PoE power supply status or the data transmission status, as shown in FIG. 6, the PoE power supply device further includes a mode indicator 7, and the mode indicator 7 is electrically connected to the control part 1. The control part 1 is further configured to, when the switch instruction sent by the key part 6 is received, control the mode indicator 7 to switch between a first display state and a second display state. The first display state indicates that the indicator 5 indicates the PoE power supply status, and the second display state indicates that the indicator 5 indicates the data transmission status.

When the PoE power supply device is a PoE switch, the indicator 5 may reuse or use a LINK indicator or an ACT indicator.

The ACT indicator is an indicator that is on the switch and that is originally used to indicate whether there is data traffic on an optical interface. For example, when the ACT indicator is steady on, it indicates that there is data traffic, and when the ACT indicator is steady off, it indicates that there is no data traffic.

In some switches, there are both the ACT indicator and the LINK indicator, and in some switches, there is only the LINK indicator.

When there are both the ACT indicator and the LINK indicator, the LINK indicator is an indicator that is on the switch and that is originally used to indicate whether there is a connection on the optical interface. For example, when the LINK indicator is steady on, it indicates that there is a connection, and when the LINK indicator is steady off, it indicates that there is no connection.

When there is only the LINK indicator, the LINK indicator is an indicator that is on the switch and that is originally used to indicate whether there is a connection and whether there is data traffic on the optical interface. For example, when the LINK indicator is steady on, it indicates that there is a connection, when the LINK indicator is blinking, it indicates that there is data traffic, and when the LINK indicator is steady off, it indicates that there is no connection.

An existing ACT indicator or an existing LINK indicator is configured to indicate the PoE power supply status, so that a new indicator does not need to be added to the PoE power supply device. Therefore, a panel size and costs of the PoE power supply device are reduced.

An original ACT indicator and an original LINK indicator are separately used as an example of the indicator 5 below to describe a case in which the indicator 5 indicates the PoE power supply status.

The indicator 5 is the original ACT indicator.

When PoE power supply of the photoelectric composite interface part 4 is normal, the ACT indicator may be displayed as steady on or blinking. When the photoelectric composite interface part 4 does not perform PoE power supply, the ACT indicator may be steady off.

Because the ACT indicator serves as the indicator 5 used to indicate the PoE power supply status, an original data traffic indication function may be indicated by the LINK indicator. For example, when the LINK indicator is steady on, it indicates that the photoelectric composite interface part 4 has a connection, when the LINK indicator is blinking, it indicates that the photoelectric composite interface part 4 has data traffic, and when the LINK indicator is steady off, it indicates that the photoelectric composite interface part 4 has no connection.

The indicator 5 is the original LINK indicator.

The indicator 5 may be a multi-function indicator. The indicator 5 indicates the PoE power supply status of the photoelectric composite interface part 4. For example, when the indicator 5 is steady on or is blinking, it indicates that there is PoE power supply, and when the indicator 5 is steady off, it indicates that there is no PoE power supply. The indicator 5 indicates the data transmission status of the photoelectric composite interface part 4. For example, when the indicator 5 is steady on, it indicates that there is a connection, when the indicator 5 is blinking, it indicates that there is data traffic, and when the indicator 5 is steady off, it indicates that there is no connection.

The foregoing cases are described below in a form of a table, as shown in Table 1. The PoE power supply device does not supply power to the PoE powered device in a non-PoE mode.

TABLE 1

| Single-indicator/Dual-indicator | Mode | Original LINK indicator | Original ACT indicator |
|---|---|---|---|
| Port dual-indicator display | PoE mode | When the original LINK indicator is steady on, it indicates data layer LINK, and when the original LINK indicator is blinking, it indicates that there is data traffic. | When the original ACT indicator is steady on or is blinking, it indicates that there is PoE power supply, and when the original ACT indicator is steady off, it indicates that there is no PoE power supply. |
| | Non-PoE mode | When the original LINK indicator is steady on, it indicates data layer LINK, and when the original LINK indicator is blinking, it indicates that there is data traffic. | When the original ACT indicator is steady off, it indicates that there is no PoE power supply. |
| Port single-indicator display | PoE mode | 1. Indicate a data transmission status: When the original LINK indicator is steady on, it indicates data layer LINK, and | None |

TABLE 1-continued

| Single-indicator/Dual-indicator | Mode | Original LINK indicator | Original ACT indicator |
|---|---|---|---|
| | | when the original LINK indicator is blinking, it indicates that there is data traffic. 2. Indicate a PoE power supply status: When the original LINK indicator is steady on or is blinking, it indicates that there is PoE power supply, and when the original LINK indicator is steady off, it indicates that there is no PoE power supply. | |
| | Non-PoE mode | 1. Indicate a data transmission status: When the original LINK indicator is steady on, it indicates data layer LINK, and when the original LINK indicator is blinking, it indicates that there is data traffic. 2. Indicate a PoE power supply status: When the original LINK indicator is steady off, it indicates that there is no PoE power supply. | None |

The PoE power supply device provided in this embodiment of this application may be configured to support both the photoelectric composite module and a common optical module. In this case, in terms of a structure, it is required that the PoE power supply terminal 423 on the photoelectric composite interface part 4 should not affect insertion of the common optical module. In other words, after being inserted into the photoelectric composite interface part 4, the common optical module does not interfere with the PoE power supply terminal 423.

When the PoE power supply device can support mixed use of the optical module, when the optical module is inserted into the photoelectric composite interface part 4, the control part 1 may further detect a type of the optical module, and perform corresponding processing based on the detected type.

Figure 7:
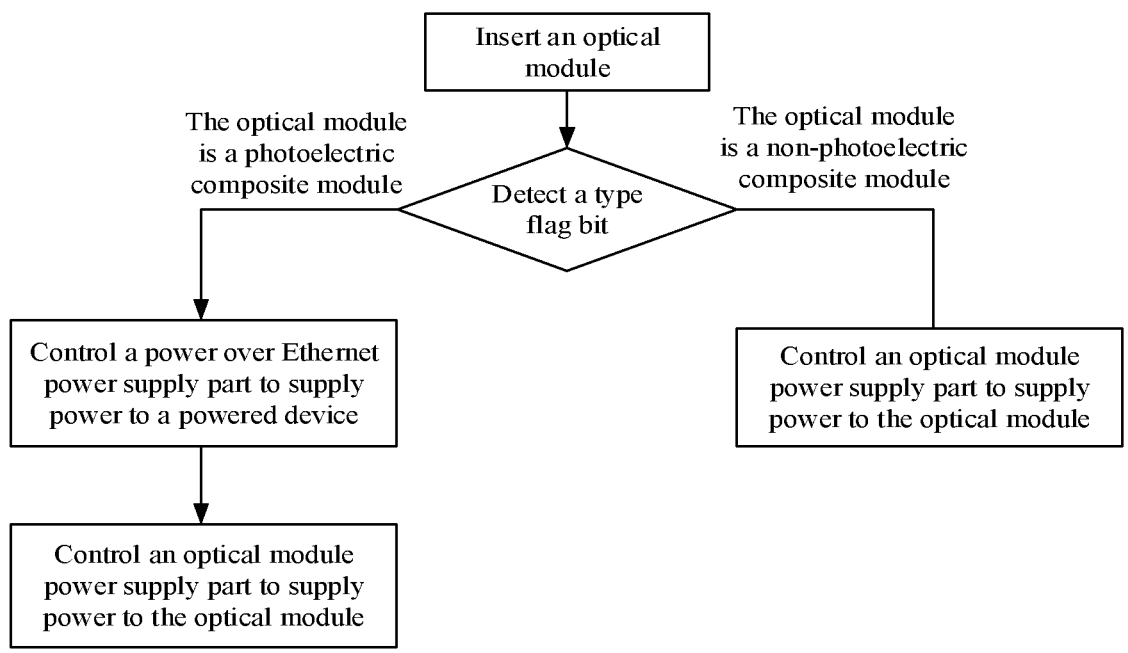
FIG. 7 is a flowchart of detection of an optical module according to an embodiment of this application.

For example, as shown in FIG. 7, when detecting that the optical module is inserted into the photoelectric composite interface part 4, the control part 1 detects a type flag bit of the optical module. If the type flag bit indicates that the optical module is a photoelectric composite module, the control part 1 detects whether a PoE powered device connected to the photoelectric composite module is in position. If it is detected that the PoE powered device is in position, the control part 1 controls the PoE power supply part 3 to supply power to the PoE powered device. In addition, the control part 1 needs to control an optical module power supply part to supply power to the optical module, so that the optical module can be powered on and used normally.

If the type flag bit indicates that the optical module is a common optical module (a non-photoelectric composite module), the control part 1 may control the optical module power supply part to supply power to the optical module, so that the optical module may be powered on and used normally.

The type flag bit is stored in a register of the optical module, and may be a reserved bit of the optical module.

In addition, before or after the type flag bit is detected, a rate flag bit of the optical module may be further detected, and the rate flag bit of the optical module indicates a transmission rate of the optical module, so that the PoE power supply device can determine a data transmission rate between the PoE power supply device and the optical module.

Figure 8:
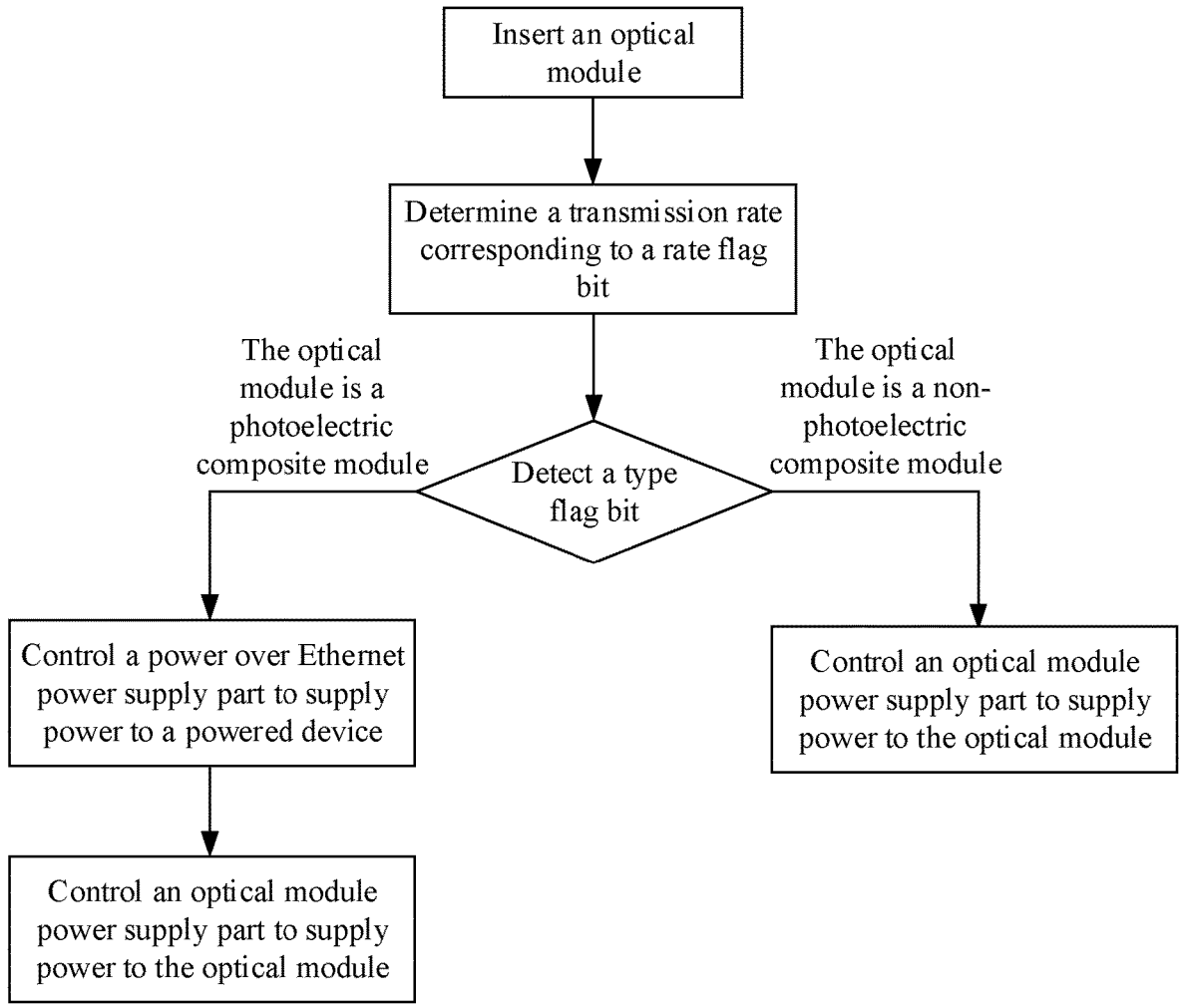
FIG. 8 is a flowchart of detection of an optical module according to an embodiment of this application.

For example, as shown in FIG. 8, when detecting that the optical module is inserted into the photoelectric composite interface part 4, the control part 1 first determines a transmission rate corresponding to a rate flag bit, and then detects the type flag bit of the optical module. If the type flag bit indicates that the optical module is a photoelectric composite module, the control part 1 detects whether a PoE powered device connected to the photoelectric composite module is in position. If it is detected that the PoE powered device is in position, the control part 1 controls the PoE power supply part 3 to supply power to the PoE powered device. In addition, the control part 1 needs to control an optical module power supply part to supply power to the optical module, so that the optical module can be powered on and used normally.

However, if the type flag bit indicates that the optical module is a common optical module, the control part 1 may control the optical module power supply part to supply power to the optical module, so that the optical module may be powered on and used normally.

An embodiment of this application provides a photoelectric composite module 8. As shown in FIG. 9, the photoelectric composite module 8 can be inserted into the photoelectric composite interface part 4. The photoelectric composite module 8 includes an optical component and a power supply component, and includes a signal connector 81 and a PoE power supply connector 82 on a side that is used to be connected to the photoelectric composite interface part 4.

The signal connector 81 includes a PCB and an edge connector disposed on the PCB. When the photoelectric composite interface part 4 is connected, the PCB extends into the insertion slot 421a on the insulated substrate 421, and is in contact with the signal terminal 422 inside the insertion slot 421a.

Two metal poles protrude from a front end of the PoE power supply connector 82.

When the photoelectric composite interface part 4 is connected, the two metal poles pass through the insertion hole 421b on the insulated substrate 421, and are in contact with the PoE power supply terminal 423.

An embodiment of this application further provides a PoE power supply system. The PoE power supply system includes a PoE power supply device, a first photoelectric composite module, a first photoelectric composite connector, a photoelectric composite cable, a second photoelectric composite connector, a second photoelectric composite module, and a PoE powered device that are sequentially connected, and the PoE power supply device includes the photoelectric composite interface part 4.

The first photoelectric composite module and the second photoelectric composite module each integrate an optical component and a signal component, and the first photoelectric composite connector and the second photoelectric composite connector can complete PoE power supply while transmitting data.

Figure 10:
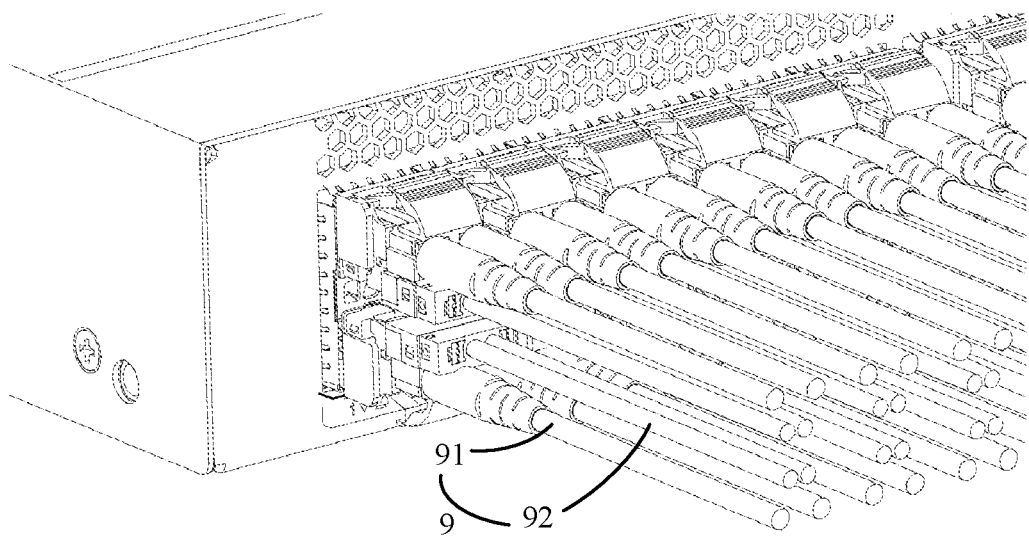
FIG. 10 is a schematic cabling diagram of a power cable in a PoE power supply system according to an embodiment of this application.

As shown in FIG. 10, there are a plurality of photoelectric composite interface parts 4 on the PoE power supply device, and the plurality of photoelectric composite interface parts 4 are arranged in an array on a panel of the PoE power supply device. A photoelectric composite cable 9 includes an optical fiber 91 and a power cable 92, and a position of the power cable 92 corresponds to space between two adjacent rows of photoelectric composite interface parts 4.

In the solution shown in this embodiment of this application, the power cable is routed in the space between two adjacent rows of photoelectric composite interface parts 4, so that space of the PoE power supply device is fully used.

As shown in FIG. 10, two rows of photoelectric composite interface parts 4 are disposed on the panel of the PoE power supply device, and a position of the power cable 92 corresponds to space between the two rows of photoelectric composite interface parts 4. The optical fiber 91 is located outside the power cable 92, and corresponds to a position of the photoelectric composite interface part 4.

An embodiment of this application further provides an interface part. The interface part may be the photoelectric composite interface part 4 provided in the embodiments of this application. As shown in FIG. 2, the interface part integrates an optical interface and an electrical interface, and is applied to a PoE power supply device. The interface part includes an optical cage 41 and a connection socket 42.

The optical cage 41 is configured to accommodate a photoelectric composite module.

The connection socket 42 is located inside the optical cage 41, and is configured to be separately connected to a signal connector and a PoE power supply connector on the photoelectric composite module.

In a specific implementation, there is a cavity inside the optical cage 41, there is a jack 411 at a first end, and the jack 411 communicates with the cavity.

The connection socket 42 is located inside the optical cage 41, and is located at a second end of the optical cage 41.

In a specific implementation, the connection socket 42 includes an insulated substrate 421, a signal terminal 422, and a PoE power supply terminal 423, and the signal terminal 422 and the PoE power supply terminal 423 are fastened to the insulated substrate 421 and separated from each other.

The signal terminal 422 is configured to be connected to the signal connector on the photoelectric composite module.

The PoE power supply terminal 423 is configured to be connected to the PoE power supply connector on the photoelectric composite module.

In a specific implementation, the insulated substrate 421 includes a body part 4211 and a protrusion part 4212 that are connected to each other, and the protrusion part 4212 protrudes from the body part 4211 toward the jack 411 of the optical cage 41.

A portion that is of the signal terminal 422 and that is connected to the signal connector is located on the protrusion part 4212.

A portion that is of the PoE power supply terminal 423 and that is connected to the PoE power supply connector is located on the body part 4211.

In a specific implementation, the signal terminal 422 includes a signal terminal internal connection part 4221, a signal terminal transmission part 4222, and a signal terminal external connection part 4223 that are sequentially connected.

The signal terminal internal connection part 4221 is located on a bottom side of the insulated substrate 421.

The signal terminal transmission part 4222 is located inside the insulated substrate 421.

There is an insertion slot 421a on a side that is of the insulated substrate 421 and that faces the jack 411, and the signal terminal external connection part 4223 is located inside the insertion slot 421a, and is configured to be connected to the signal connector on the photoelectric composite module.

In a specific implementation, the PoE power supply terminal 423 includes a power supply terminal internal connection part 4231, a power supply terminal transmission part 4232, and a power supply terminal external connection part 4233 that are sequentially connected.

The power supply terminal internal connection part 4231 is located on the bottom side of the insulated substrate 421.

The power supply terminal transmission part 4232 is located inside the insulated substrate 421.

The power supply terminal external connection part 4233 is located on the side that is of the insulated substrate 421 and that faces the jack 411, and is configured to be connected to the PoE power supply connector on the photoelectric composite module.

In a specific implementation, the power supply terminal external connection part 4233 is strip-shaped, and is perpendicular to an insertion direction of the photoelectric composite module.

It should be noted that the interface part provided in this embodiment of this application may be the same as the photoelectric composite interface part 4 provided in the embodiments of this application. Therefore, for a detailed technical feature of the interface part, refer to related content in the photoelectric composite interface part 4. Details are not described herein again.

An embodiment of this application further provides a method for detecting an optical module. The method is applied to a PoE power supply device, the PoE power supply device includes a photoelectric composite interface part 4, the photoelectric composite interface part 4 integrates an optical interface and an electrical interface, and the method includes, when it is detected that an optical module is inserted into the photoelectric composite interface part 4, detecting a type flag bit of the optical module, if the type flag bit indicates that the optical module is a photoelectric composite module, detecting whether a PoE powered device connected to the optical module is in position, and if it is detected that the PoE powered device is in position, controlling the PoE power supply device to supply power to the PoE powered device.

In a specific implementation, after the controlling the PoE power supply device to supply power to the PoE powered device, the method further includes controlling the PoE power supply device to supply power to the optical module.

In a specific implementation, after the detecting a type flag bit of the optical module, the method further includes, if the type flag bit indicates that the optical module is a non-photoelectric composite module, controlling the PoE power supply device to supply power to the optical module.

In this application, the terms "first" and "second" are merely intended for description, and shall not be understood as an indication or implication of relative importance. The term "a plurality of" means two or more, unless otherwise expressly limited.

The foregoing descriptions are merely optional embodiments of this application, but are not intended to limit this application. Any modification, equivalent replacement, improvement, or the like made without departing from the principle of this application should fall within the protection scope of this application.

What is claimed is:

1. A Power over Ethernet (PoE) power supply device comprising:
    a control part;
    a service processing part electrically coupled to the control part;
    a PoE power supply part electrically coupled to the control part; and
    a photoelectric composite interface part comprises a connection socket configured to be coupled to a photoelectric composite module, and wherein the connection socket is separately electrically coupled to the service processing part and the PoE power supply part and is configured to be separately coupled to a signal connector and a PoE power supply connector on the photoelectric composite module, and wherein the connection socket comprises:
    an insulated substrate;
    a signal terminal fastened to the insulated substrate, wherein the signal terminal is configured to be coupled to the signal connector; and
    a PoE power supply terminal separated from the signal terminal and fastened to the insulated substrate, wherein the PoE power supply terminal is configured to be coupled to the PoE power supply connector;
    wherein the insulated substrate comprises:
    a body part comprising a first portion of the PoE power supply terminal that is coupled to the PoE power supply connector; and
    a protrusion part coupled to the body part, wherein the protrusion part comprises a second portion of the signal terminal that is coupled to the signal connector.

2. The PoE power supply device of claim 1, wherein the photoelectric composite interface part further comprises:
    an optical cage configured to accommodate the photoelectric composite module and comprising:
    a first end;
    a second end;
    a cavity that is located inside the optical cage; and
    a jack located at the first end and communicating with the cavity, and wherein the connection socket is located inside the cavity of the optical cage at the second end of the optical cage.

3. The PoE power supply device of claim 2, wherein the signal terminal is electrically coupled to the service processing part, and wherein the PoE power supply terminal is electrically coupled to the PoE power supply part.

4. The PoE power supply device of claim 3, wherein the protrusion part protrudes from the body part toward the jack.

5. The PoE power supply device of claim 3, further comprising an insertion slot on a side of the insulated substrate that faces the jack, wherein the signal terminal comprises:
    a signal terminal internal connection part located on a bottom side of the insulated substrate and configured to be electrically coupled to the service processing part;
    a signal terminal transmission part coupled to the signal terminal internal connection part and located inside the insulated substrate; and
    a signal terminal external connection part coupled to the signal terminal transmission part and located inside the insertion slot, wherein the signal terminal external connection part is configured to be coupled to the signal connector.

6. The PoE power supply device of claim 3, wherein the PoE power supply terminal comprises:
    a power supply terminal internal connection part located on a bottom side of the insulated substrate and configured to be electrically coupled to the PoE power supply part;
    a power supply terminal transmission part coupled to the power supply terminal internal connection part and located inside the insulated substrate; and
    a power supply terminal external connection part coupled to the power supply terminal transmission part and located on a side of the insulated substrate that faces the jack, wherein the power supply terminal external connection part is configured to be coupled to the PoE power supply connector.

7. The PoE power supply device of claim 6, wherein the power supply terminal external connection part is strip-shaped and is perpendicular to an insertion direction of the photoelectric composite module.

8. The PoE power supply device of claim 6, further comprising an insertion hole on the side that is of the insulated substrate and that faces the jack and the power supply terminal external connection part is located inside the insertion hole.

9. The PoE power supply device of claim 1, further comprising a plurality of photoelectric composite interface parts arranged in an array on a panel of the PoE power supply device, wherein structures of any two of the photoelectric composite interface parts at opposite positions in two adjacent rows are symmetrical to each other.

10. The PoE power supply device of claim 1, further comprising one or more indicators in a one-to-one correspondence with one or more photoelectric composite interface parts, wherein each of the one or more indicators is electrically coupled to the control part, and wherein the control part is configured to control, based on a detected PoE power supply status of each of the one or more photoelectric composite interface parts, a PoE power supply status of a corresponding photoelectric composite interface part that is indicated by a corresponding indicator.

11. The PoE power supply device of claim 10, wherein the PoE power supply device is a PoE switch, and wherein each of the one or more indicators is a LINK indicator or an ACT indicator.

12. The PoE power supply device of claim 1, wherein when an optical module is inserted into the photoelectric composite interface part and when a type flag bit of the optical module indicates that the optical module is the photoelectric composite module and a PoE powered device coupled to the optical module is in position, the control part is configured to control the PoE power supply part to supply power to the PoE powered device.

13. The PoE power supply device of claim 12, wherein after controlling the PoE power supply part to supply power to the PoE powered device, the control part is further configured to control the PoE power supply device to supply power to the optical module.

14. The PoE power supply device of claim 12, wherein when the optical module is inserted into the photoelectric composite interface part and when the type flag bit indicates that the optical module is a non-photoelectric composite module, the control part is further configured to control the PoE power supply device to supply power to the optical module.

15. A Power over Ethernet (PoE) power supply system comprising:
   a PoE power supply device comprising:
      a control part;
      a service processing part electrically coupled to the control part;
      a first photoelectric composite module;
      a PoE power supply part electrically coupled to the control part; and
      a photoelectric composite interface part integrating an optical interface and an electrical interface, wherein the photoelectric composite interface part comprises a connection socket configured to be coupled to the first photoelectric composite module, wherein the connection socket is separately electrically coupled to the service processing part and the PoE power supply part and is configured to be separately coupled to a signal connector and a PoE power supply connector on the first photoelectric composite module, and wherein the connection socket comprises:
         an insulated substrate;
         a signal terminal fastened to the insulated substrate, wherein the signal terminal is configured to be coupled to the signal connector; and
         a PoE power supply terminal separated from the signal terminal and fastened to the insulated substrate, wherein the PoE power supply terminal is configured to be coupled to the PoE power supply connector;
         wherein the insulated substrate comprises:
            a body part comprising a first portion of the PoE power supply terminal that is coupled to the PoE power supply connector; and
            a protrusion part coupled to the body part, wherein the protrusion part comprises a second portion of the signal terminal that is coupled to the signal connector;
   a first photoelectric composite connector coupled to the first photoelectric composite module;
   a photoelectric composite cable coupled to the first photoelectric composite connector;
   a second photoelectric composite connector coupled to the photoelectric composite cable;
   a second photoelectric composite module coupled to the second photoelectric composite connector; and
   a PoE powered device coupled to the second photoelectric composite module.

16. The PoE power supply system of claim 15, wherein the PoE power supply device further comprises a plurality of photoelectric composite interface parts-arranged in an array on a panel of the PoE power supply device, wherein the photoelectric composite cable comprises an optical fiber and a power cable, and wherein a position of the power cable corresponds to a space between two adjacent rows of the photoelectric composite interface parts.

17. An interface part applied to a Power over Ethernet (PoE) power supply device, wherein the interface part comprises:
   an optical interface;
   an electrical interface;
   an optical cage configured to accommodate a photoelectric composite module; and
   a connection socket located inside the optical cage and configured to be separately coupled to a signal connector and a PoE power supply connector on the photoelectric composite module, wherein the connection socket comprises:
      an insulated substrate;
      a signal terminal fastened to the insulated substrate, wherein the signal terminal is configured to be coupled to the signal connector; and
      a PoE power supply terminal separated from the signal terminal and fastened to the insulated substrate, wherein the PoE power supply terminal is configured to be coupled to the PoE power supply connector;
   wherein the insulated substrate comprises:
      a body part comprising a first portion of the PoE power supply terminal that is coupled to the PoE power supply connector; and
      a protrusion part coupled to the body part, wherein the protrusion part comprises a second portion of the signal terminal that is coupled to the signal connector.

18. A method implemented by a Power over Ethernet (PoE) power supply device, wherein the method comprises: controlling a PoE power supply part of the PoE power supply device to supply power to a PoE powered device coupled to an optical module when the optical module is inserted into a photoelectric composite interface part of the PoE power supply device and when a type flag bit of the optical module indicates that the optical module is a photoelectric composite and the PoE powered device is in position.

19. The method of claim 18, wherein after controlling the PoE power supply part to supply power to the PoE powered device, the method further comprises controlling the PoE power supply device to supply power to the optical module.

20. The method of claim 18, wherein when the optical module is inserted into the photoelectric composite interface part and when the type flag bit indicates that the optical module is a non-photoelectric composite module, the method further comprises controlling the PoE power supply device to supply power to the optical module.

* * * * *